United States Patent
He et al.

(10) Patent No.: US 12,044,521 B2
(45) Date of Patent: Jul. 23, 2024

(54) METHOD FOR SUPPRESSING REFLECTION OF BINARY GRATING IMAGE PROJECTION BASED ON HIGH-FREQUENCY PATTERN INTERFERENCE

(71) Applicant: ZHEJIANG UNIVERSITY, Hangzhou (CN)

(72) Inventors: Zaixing He, Hangzhou (CN); Peilong Li, Hangzhou (CN); Xinyue Zhao, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/766,236

(22) PCT Filed: Nov. 13, 2020

(86) PCT No.: PCT/CN2020/128627
§ 371 (c)(1),
(2) Date: Apr. 2, 2022

(87) PCT Pub. No.: WO2021/143331
PCT Pub. Date: Jul. 22, 2021

(65) Prior Publication Data
US 2024/0053142 A1    Feb. 15, 2024

(30) Foreign Application Priority Data

Jan. 15, 2020   (CN) .......................... 202010044390.8

(51) Int. Cl.
*G01B 11/25* (2006.01)
(52) U.S. Cl.
CPC ...... *G01B 11/2509* (2013.01); *G01B 11/2531* (2013.01); *G01B 11/254* (2013.01)

(58) Field of Classification Search
CPC . G01B 11/25; G01B 11/2509; G01B 11/2513; G01B 11/2531; G01B 11/254; G01B 11/2441
See application file for complete search history.

(56) References Cited

U.S. PATENT DOCUMENTS

| | | | |
|---|---|---|---|
| 6,441,909 B1 * | 8/2002 | Kobayashi | G01B 11/2536 250/237 G |
| 2008/0063260 A1 * | 3/2008 | Lin | G01B 11/2509 356/601 |

(Continued)

FOREIGN PATENT DOCUMENTS

| | | | |
|---|---|---|---|
| CN | 1554925 A | * | 12/2004 |
| CN | 104677308 A | * | 6/2015 |

(Continued)

*Primary Examiner* — Michael P Stafira
(74) *Attorney, Agent, or Firm* — Jiwen Chen; Joywin IP Law PLLC

(57) ABSTRACT

The present invention discloses a method for suppressing reflection of binary grating image projection based on high-frequency pattern interference including generating multiple high-frequency patterns for reflection suppression; generating a binary grating for three-dimensional appearance measurement, wherein the binary grating is inverted to generate a reverse binary grating; generating multiple interfering binary gratings. The projection images of multiple interfering binary gratings projected by the projector and then collected by the camera are used as output images, and all output images are synthesized in a certain manner to obtain an output image after reflection suppression, which is used as a result of the binary grating image to be projected after reflection suppression. The invention effectively eliminates the wrong measurement result caused by reflection in the three-dimensional measurement of the binary grating pro- (Continued)

jection method, and improves the accuracy of the three-dimensional appearance measurement based on the binary grating projection method.

6 Claims, 3 Drawing Sheets

(56) References Cited

U.S. PATENT DOCUMENTS

2012/0154577 A1    6/2012  Yoshikawa
2018/0365847 A1*  12/2018  Miyata ................. G06T 7/0002

FOREIGN PATENT DOCUMENTS

| | | | | |
|---|---|---|---|---|
| CN | 105806259 A | * | 7/2016 | ......... G01B 11/2531 |
| CN | 107431779 A | * | 12/2017 | ............. G06T 7/521 |
| CN | 108195313 | | 6/2018 | |
| CN | 108519064 | | 9/2018 | |
| CN | 108645354 | | 10/2018 | |
| CN | 108680142 A | * | 10/2018 | |
| CN | 109425308 | | 3/2019 | |
| CN | 109579738 A | * | 4/2019 | ......... G01B 11/2433 |
| JP | 2005181243 A | * | 7/2005 | |
| JP | 2011002240 | | 2/2011 | |

* cited by examiner

METHOD FOR SUPPRESSING REFLECTION OF BINARY GRATING IMAGE PROJECTION BASED ON HIGH-FREQUENCY PATTERN INTERFERENCE

This is a U.S. national stage application of PCT Application No. PCT/CN2020/128627 under 35 U.S.C. 371, filed Nov. 13, 2020 in Chinese, claiming priority to Chinese Patent Applications No. 202010044390.8, filed Jan. 15, 2020, all of which are hereby incorporated by reference.

TECHNICAL FIELD

The present invention relates to the field of active three-dimensional shape measurement, and mainly relates to reverse engineering based on binary grating projection method, which uses high-frequency pattern interference to remove reflective areas distributed on the surface of a measured object, and in particular relates to a method for suppressing reflection of binary grating image projection based on high-frequency pattern interference.

BACKGROUND TECHNOLOGY

The binary grating projection method is a structured light three-dimensional measurement technology, which has the advantages of fast measurement speed and high measurement accuracy. In recent years, it has developed to be one of the main technologies for structured light three-dimensional measurement.

In the practical application of the binary grating projection method, it is necessary to project a periodically distributed grating field on the measured object, and the height of the object's appearance is contained in the distribution of the grating field. The distribution of the grating field is collected by the camera and decoded by binary threshold segmentation to obtain the shape and height information of the object. Affected by the reflection characteristics of the measured object and the distribution characteristics of the projection surface light source, the grating easily forms a high-brightness reflective area on the surface of the measured object, which interferes with the threshold segmentation result, affects the decoding accuracy, reduces the measurement accuracy of the three-dimensional appearance, and even causes the three-dimensional appearance measurement results show holes and defects in the reflective area.

The existing methods for suppressing the reflective area in the binary grating projection method are mainly developed from two aspects: avoiding the generation of the reflective area and overcoming the influence of the reflective area. In terms of avoiding the generation of reflective areas, Feng Wei et al. used interpolation prediction search algorithms to obtain the best projection gray value, to reduce the intensity of grating projection, and avoid the occurrence of reflective phenomena to a certain extent. In terms of overcoming the influence of the reflective area, Budianto et al., based on the distribution characteristics of the grating projection, restored the missing grating information in the reflective area through image restoration, to overcome the impact of the reflective area on the grating projection and three-dimensional measurement accuracy.

The main problems of the above-mentioned existing methods are:

First, the existing method of avoiding the generation of reflective areas is based on reducing the intensity of the grating projection; in actual measurement, reducing the intensity of the grating projection will reduce the quality of the grating field collected by the camera and increase the interference of the projection grating field of the background light intensity, leading to a reduction in the accuracy of the three-dimensional measurement. In addition, it is difficult to suppress excessively strong reflections only by reducing the intensity of the grating projection, and it relies on more complex fitting algorithms to determine the degree of reduction in the intensity of the grating projection, the efficiency of the method and the convenience of operation needs to be improved;

Second, for the existing method to overcome the influence of the reflective area, because it uses the grating information near the reflective area that is not interfered by the reflection as a basis to estimate and repair the missing grating information in the reflective area, and because the estimation result inevitably has errors, while suppressing reflections, the image restoration process may destroy the grating field distribution and introduce additional measurement errors.

SUMMARY OF THE INVENTION

In view of the above-mentioned problems in the background, the present invention proposes a method for suppressing reflection in binary grating image projection based on high-frequency pattern interference. By means of high-frequency pattern interference, an interference binary grating is generated; through projecting interference binary grating, the reflected light component is removed from the output image to achieve reflection suppression, effectively eliminate the influence of the reflection area on the binary grating field distribution, and improve the accuracy of the three-dimensional appearance measurement based on the binary grating projection method.

As shown in FIG. 2, the technical solution adopted by the present invention is:

Step 1), generating multiple high-frequency patterns for reflection suppression;

Step 2), generating a binary grating for three-dimensional appearance measurement. The binary grating is a grating composed of a binary 0-1 coded stripe code. The binary grating is inverted to generate a reverse binary grating. The reverse binary grating is used for reflection suppression;

Step 3), generating multiple interfering binary gratings, the interfering binary grating is obtained by interfering the encoding value in the high-frequency pattern and the encoding value in the binary grating/inverted binary grating, and the interfering binary grating is used for reflection suppression;

Step 4), the projection images of multiple interfering binary gratings projected by the projector and then collected by the camera are used as output images, and all output images are synthesized in a certain manner to obtain an output image after reflection suppression, which is used as a result of the binary grating image to be projected after reflection suppression, the reflection suppression of the output image corresponding to the binary grating projection is realized.

The reflection suppression is to suppress the reflection area that appears in the output image when the binary grating used for three-dimensional appearance measurement is projected. The reflective area is a high-brightness area formed by the accumulation of reflected light generated by the grating light source irradiating the surface of the object to be measured in a specific position. The above-mentioned high-frequency patterns, inverted binary gratings, and interfering binary gratings are all used to achieve reflection suppression.

In the step 1), the high-frequency pattern is a pattern formed by array encoding in a binary 0-1 encoding mode, and the encoding value in the high-frequency pattern has high-frequency periodic changes in both the horizontal and vertical directions. The multiple high-frequency patterns satisfy the following conditions: multiple high-frequency patterns have the same number of rows and columns, and for each pixel at each position, the encoding value of the multiple high-frequency patterns at this pixel is not all 0 nor all 1.

The inversion operation in the step 2) is to perform a "not" logic operation on all the encoding values in the binary grating, that is, set the element with the encoding value of 0 to 1, and set the element with the encoding value of 1 to 0.

In the step 3), the multiple high-frequency patterns are respectively interfered with the binary grating to obtain multiple forward interfering binary gratings, and the multiple high-frequency patterns are respectively interfered with the reversed binary grating to obtain multiple reverse interfering binary gratings. Multiple forward interfering binary gratings and multiple reverse interfering binary gratings are gathered together to form multiple interfering binary gratings. The interference operation is performed by traversing for each row/column using the interference logic operation shown in Table 1, and performing the interference logic operation shown in Table 1 on the binary elements $p_1$ and $p_2$ at the same position in the images:

TABLE 1

| Input | | Output |
|---|---|---|
| $p_1(x, y)$ | $p_2(x, y)$ | $p_1(x, y) \odot p_2(x, y)$ |
| 0 | 1 | 0 |
| 0 | 0 | 0 |
| 1 | 1 | 1 |
| 1 | 0 | 0 |

In the above table, $p_1$ is the encoding value located in the x-th row and y-th column of the high-frequency pattern, $p_2$ is the encoding value located in the x-th row and y-th column in the binary grating/reverse binary grating, and $\odot$ is the interference logic operator, $p_1(x, y) \odot p_2(x, y)$ represents the output result of the interference logic operation, and the output result is taken as the encoding value of the x-th row and y-th column in the interfering binary grating.

As shown in FIG. 4, for the grating that interferes with the high-frequency pattern, the above-mentioned interference logic operation guarantees the following. The pixel with an encoding value of 0 in the grating before the interference operation is still 0 after the interference operation. For the pixel with an encoding value of 1 in the grating before the interference operation, the encoding value after the interference operation depends on the encoding value at that pixel in the high-frequency pattern, that is, if the encoding value of the high-frequency pattern at the pixel is 1, then the result of the interference operation is 1; if the encoding value of the high-frequency pattern at the pixel point is 0, the result of the interference operation is 0. Combining the characteristics of the multiple high-frequency patterns described in step 1), for each pixel with an encoding value of 1 in the binary grating, the encoding value at this pixel in the multiple forward/reverse interfering binary grating is not all 0 nor all 1. For each pixel with an encoding value of 0 in the binary grating, the encoding value at this pixel in the multiple positive interfering binary gratings is all 0.

In combination with FIG. 4 and the principle of the above-mentioned interference operation, the encoding value in the interfering grating obtained by the interference operation also has a high-frequency periodic change in the horizontal direction/vertical direction. Therefore, the projection result of the interfering grating also satisfies the light intensity decomposition formula. On the base of this, the step 4) makes full use of the light intensity decomposition formula to achieve reflection suppression.

In the step 4), a grating projection system is adopted. The grating projection system includes a projector (1), a camera (2), and an object to be measured (3). The projector (1) and the camera (2) are respectively placed on either side of the upper side of the object to be measured (3). The lens of the projector (1) and the lens of the camera (2) are facing the object to be measured (3). The interfering binary grating is input to the projector (1) and projected onto the object to be measured (3), the camera (2) collects the image projected by the interfering binary grating onto the object to be measured (3) as the output image.

In the step 4), the synthesis process of the output image is traversing for each row/column in the following manner, and specifically as follows:

Step 4.1), the forward interfering binary grating is input to the projector (1) and projected onto the object to be measured (3), and the output image is collected by the camera (2), and the N output images corresponding to the forward interfering binary grating are represented for $I_1^+, I_2^+, \ldots, I_N^+$, the inverse interfering binary grating is input to the projector (1) and projected onto the object to be measured (3), and the output image is collected by the camera (2), and the N output images corresponding to the inverse interfering binary grating are represented for $I_1^-, I_2^-, \ldots, I_N^-$, for each pixel (x, y) in the output image, perform the following processing to obtain a forward auxiliary image $A^+$ and a reverse auxiliary image $A^-$ for following reflection suppression:

$$\begin{cases} A^+(x, y) = \max[I_1^+(x, y), I_2^+(x, y), \ldots, I_N^+(x, y)] - \\ \quad \min[I_1^+(x, y), I_2^+(x, y), \ldots, I_N^+(x, y)] \\ A^-(x, y) = \max[I_1^-(x, y), I_2^-(x, y), \ldots, I_N^-(x, y)] - \\ \quad \min[I_1^-(x, y), I_2^-(x, y), \ldots, I_N^-(x, y)] \end{cases}$$

wherein, (x, y) is the pixel in the x-th row and y-th column in the output image; max[ . . . ] represents the maximum value of all gray values in the square brackets;

Combining FIG. 3 and the light intensity decomposition formula, taking the forward auxiliary image $A^+$ as an example, the calculation principle of the above formula is explained as follows:

For each pixel with an encoding value of 1 in the binary grating, the encoding value at this pixel in the multiple positive interfering binary gratings is not all 0 nor all 1. An encoding value of 0 indicates that the light source at the coded pixel is off, and an encoding value of 1 indicates that the light source at the coded pixel is on. The light source generated at the above pixel points guarantees the following: for any scene point (x, y) that may be illuminated by the light source on the surface of the object under test, multiple light sources generated by multiple forward interfering binary gratings may directly illuminate the scene point (as shown in the left image of FIG. 3(b)), the scene point may not be directly illuminated (as shown in the right image of FIG. 3(b)), and the above two situations must exist. As shown in the left image of FIG. 3(b), for the case of direct illumination, the light intensity at the scene point in the output image is represented for $I_+(x,y)=I_d(x, y)+I_g(x,y)$; as shown in the right image of FIG. 3(b) for the case of not direct illumination, the light intensity at the scene point in the output image is represented for $I_-(x,y)=I_g(x,y)$; and it must be $I_+(x,y)>I_-(x,y)$. Therefore, in the N output images corresponding to the forward interfering binary grating, $I_+(x,y)$ and $I_-(x,y)$ can be calculated in the manner with taking the maximum value and the minimum value as follows:

$$\begin{cases} I_+(x, y) = \max[I_1^+(x, y), I_2^+(x, y), \ldots, I_N^+(x, y)] \\ I_-(x, y) = \min[I_1^+(x, y), I_2^+(x, y), \ldots, I_N^+(x, y)] \end{cases},$$

According to the above formula, the reflective component is removed and the direct component is retained by the following calculation, and the forward auxiliary image $A^+$ is calculated to achieve the reflection suppression:

$$A^+(x,y)=I_d(x,y)=I_+(x,y)-I_-(x,y)$$

The calculation principle of the reverse auxiliary image $A^-$ can be deduced by analogy, so it won't be repeated here.

Step 4.2), the forward auxiliary image $A^+$ and the reverse auxiliary image $A^-$ are subjected to a differential operation to obtain the output image R after reflection suppression. The differential operation refers to that each pixel (x, y) in the output image, is expressed as:

$$R(x,y)=A^+(x,y)-A^-(x,y)$$

The effects of the above processing are as follows. First, it can increase the contrast of the output image, and improve the robustness of the subsequent binary threshold segmentation of the output image. Second, the background light intensity at the same pixel point (x, y) in the forward auxiliary image and the reverse auxiliary image are the same. Therefore, the influence of the background light intensity on the output image can be offset, and the robustness of the subsequent binary threshold segmentation of the output image can be further improved.

The present invention linearly decomposes the light intensity reflected by the binary grating field in the output image into two components: the direct component Id and the reflective component Ig, as shown in FIG. 3(a). The reflective component is the high-brightness light intensity component formed by multiple beams of reflected light irradiated to the surface of the object to be measured by the grating light source, reflected at least twice, and accumulated on a specific area on the surface of the object to be measured, as shown in FIG. 3(a), the components of the reflected light at point A include the direct component Id of the optical path of Op-A-Oc and the reflective component Ig of the path of Op-B-A-Oc. The reflective component is the cause of the reflective area. The direct component is a light intensity component formed by a beam of reflected light that is directly irradiated by the grating light source to the surface of the object to be measured, and is reflected only once.

The present invention has found through experiments that for a grating with high-frequency light and dark changes in the horizontal/vertical direction, the light intensity I(x, y) at the pixel point in the x-th row and y-th column in the output image conforms to the following light intensity decomposition formula, as shown in FIG. 3(a):

$$I(x,y)=I_d(x,y)+I_g(x,y)$$

The present invention calibrates the direct component Id and the reflective component Ig generated by the binary grating field irradiating the surface of the object to be measured by projecting multiple interference binary gratings, removes the reflective component Ig from the light intensity I, and retains the direct component Id, thereby achieving reflective suppression.

The beneficial effects of the present invention are:

First, the present invention uses multiple projected interfering binary gratings to separate the reflective components that cause reflections in the output image, retain the direct components after reflection suppression, and simply take the maximum value, the minimum value, and the subtraction operation, realize reflection suppression, avoid the complex fitting algorithm that traditional methods need to reduce the light intensity of the grating projection, and also avoid the complex restoration algorithm that traditional methods need to perform image restoration on the reflective area, and improve the efficiency and convenience of reflection suppression, also guarantee the anti-reflective effect.

Second, the present invention avoids the additional error introduced by the reflection suppression method based on image restoration to the grating field, and ensures the accuracy of the three-dimensional appearance measurement based on the binary grating projection method after the reflection suppression.

Third, the present invention can eliminate the reflection phenomenon caused by the background light intensity, and can realize the reflection suppression when there is a strong reflection phenomenon, and overcome the limitation of the reflection suppression method based on reducing the projection light intensity.

In summary, the present invention effectively suppresses the reflection phenomenon existing in the output image of the binary grating projection collected by the camera, and improves the accuracy of the three-dimensional appearance measurement based on the binary grating projection.

BRIEF DESCRIPTION OF THE DRAWINGS

FIG. 3(b) is the principal diagram of light intensity decomposition;

FIGS. 4(a) and (b) are a schematic diagram of the high-frequency patterns, binary stripes, and interfering binary stripes used in an embodiment of the present invention, wherein FIG. 4(a) shows 6 high-frequency patterns forming multiple high-frequency patterns.

FIGS. 5(a) and 5(b) are a comparison diagram of output images before and after reflection suppression in an embodiment of the present invention, wherein FIG. 5(a) is an output image collected by a camera without reflection suppression after projection of a binary grating in an embodiment of the present invention; FIG. 5(b) is an embodiment of the present invention, using the method of the present invention to perform reflection suppression on the result shown in FIG. 5(a), and the resulting output image after reflection suppression;

FIGS. 6(a) and 6(b) are a comparison diagram of three-dimensional appearance measurement results before and after reflection suppression in an embodiment of the present invention, wherein, FIG. 6(a) is the three-dimensional appearance measurement result of the output image without reflection suppression, and FIG. 6(b) is the three-dimensional appearance measurement result of the output image after reflection suppression obtained by the method of the present invention.

In the figures: projector 1, camera 2, object to be measured 3.

DESCRIPTION OF THE EMBODIMENTS

The present invention will be further described below in conjunction with figures and examples.

Figure 1:
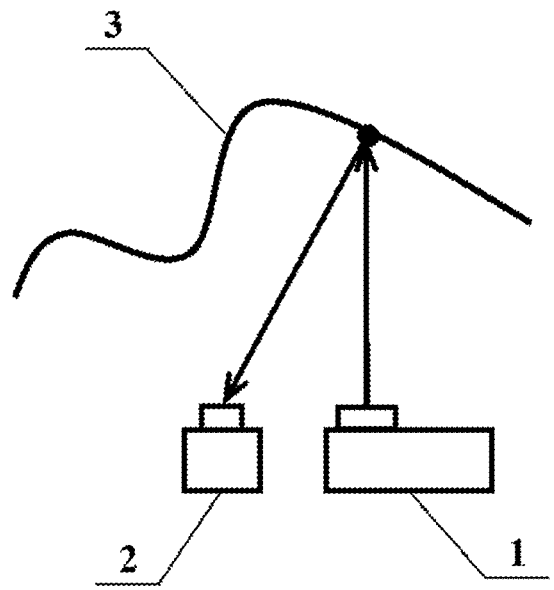
FIG. 1 is a schematic diagram of the layout and connection of the projection grating system of the present invention.
Figure 2:
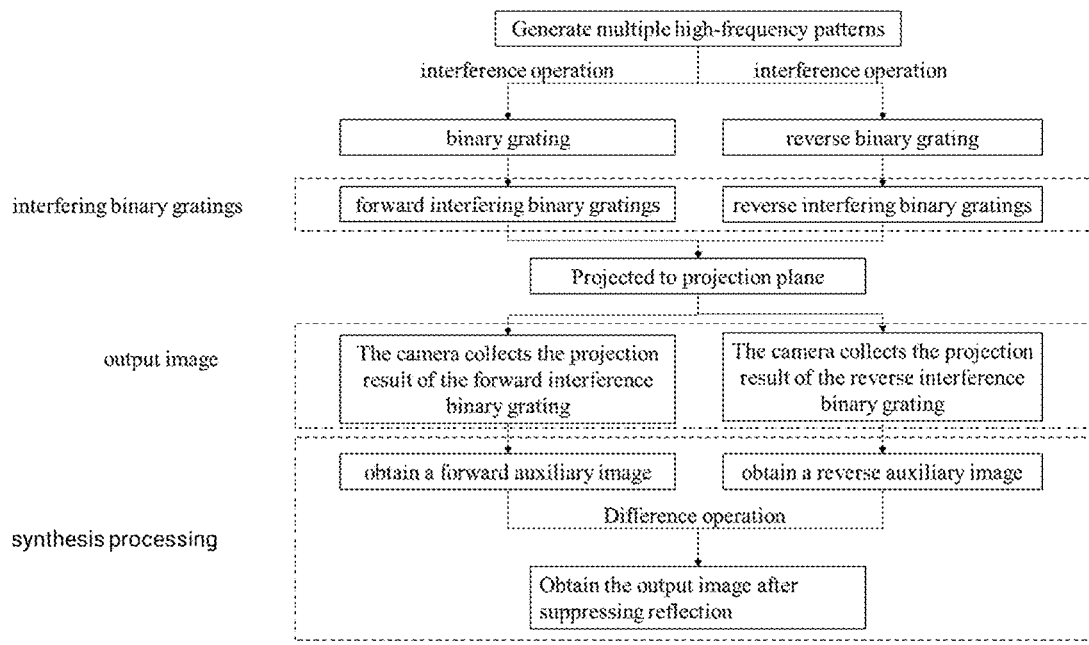
FIG. 2 is a flow chart of the present invention to achieve reflection suppression.

Embodiments uses the grating projection system shown in FIG. 1. The grating projection system includes a projector 1, a camera 2, and an object to be measured 3. The projector 1 and the camera 2 are respectively placed on both sides of the upper side of the object to be measured 3. The lens of the projector 1 and the lens of the camera 2 are facing the object to be measured 3. The interfering binary grating is input to the projector 1 and projected onto the object to be measured 3, the camera 2 collects the image projected by the interfering binary grating onto the object to be measured 3 as the output image.

Figure 4A:
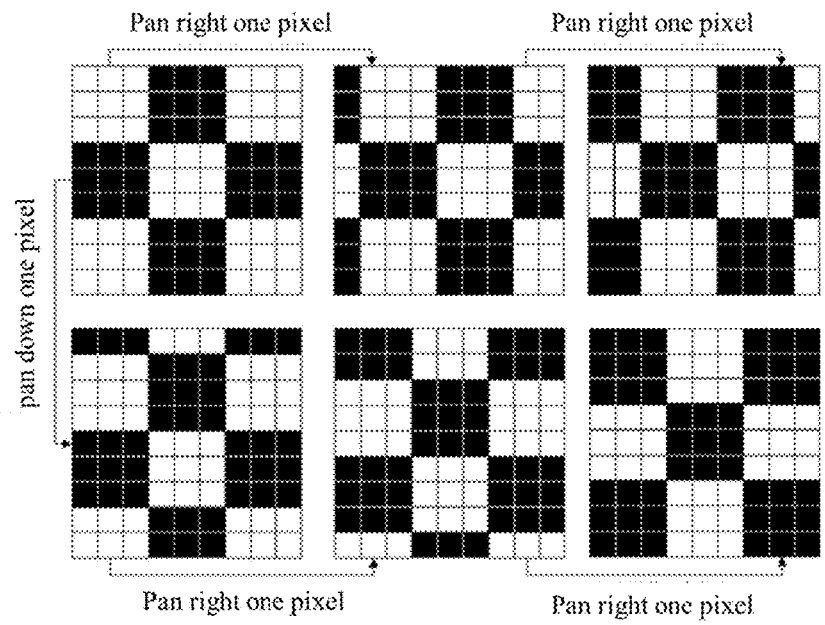

The embodiment of the present invention is as follows:

Step 1), generating multiple high-frequency patterns; the high-frequency patterns are patterns used for reflection suppression using a binary 0-1 encoding method, and the encoding values in the high-frequency patterns exist high frequency periodic change in both the horizontal and vertical directions. As shown in FIG. 4(a), in this embodiment, the high-frequency pattern is composed of a number of square areas of equal size, and each square area is composed of a number of pixels coded as all 0 or all 1, that square areas coded as all 0 are shown as white squares, and square areas coded as all 1 are shown as black squares. The side length of the square area is 3 pixels. In the horizontal direction, the high-frequency pattern shows high-frequency alternating distribution of black squares and white squares. Shifting the first high-frequency pattern to the right and downwards as a whole. The distance of each shift is 1 pixel, while perform multiple shifts in succession, you can get 6 different high-frequency patterns. The number of shifts is two times of the side length of the square; the above 6 high-frequency patterns together constitute multiple high-frequency patterns. Multiple high-frequency patterns are the basis for subsequent generation of interfering binary gratings.

Figure 4B:
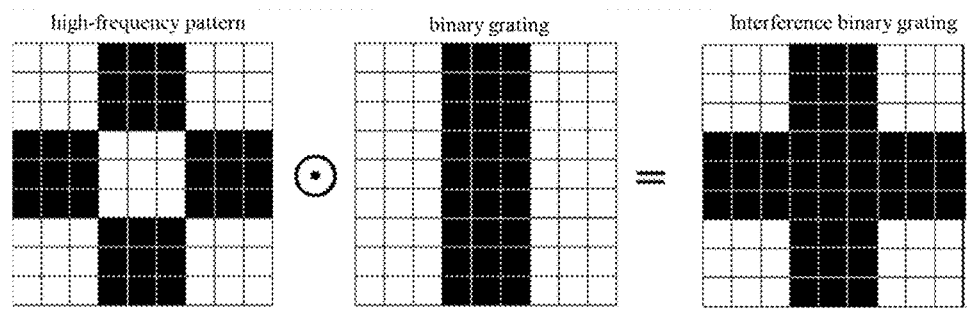
FIG. 4(b) shows the high-frequency pattern interferes with the binary stripes to obtain the interfering binary stripes.

The multiple high-frequency patterns shown in FIG. 4(a) meet the following conditions: multiple high-frequency patterns have the same number of rows and columns, and there is a translation of the encoding values in the same direction with a distance of 1 pixel between two adjacent high-frequency patterns in the horizontal direction/vertical direction. For each pixel at a specific position, the encoding value of multiple high-frequency patterns at this pixel is not all 0 nor all 1;

Step 2), performing the inversion operation on the binary grating to generate the inverse binary grating; the binary grating is a kind of grating that adopts binary 0-1 encoding and is used for three-dimensional appearance measurement; the inversion operation is performing a "not" logic operation on all the encoding values in the binary grating, that is, setting the element with the encoding value of 0 to 1, and setting the element with the encoding value of 1 to 0; the inverse binary grating is used for reflection suppression;

Step 3), interfering the encoding value in the high-frequency pattern and the encoding value in the binary grating/inverted binary grating, to generate multiple interfering binary gratings. The schematic diagram of the interference operation is shown in FIG. 4(b).

The multiple high-frequency patterns are respectively interfered with the binary grating to obtain multiple forward interfering binary gratings, and the multiple high-frequency patterns are respectively interfered with the reversed binary grating to obtain multiple reverse interfering binary gratings. Multiple forward interfering binary gratings and multiple reverse interfering binary gratings are gathered together to form multiple interfering binary gratings;

The interference operation in step 3) is performed traversing for each row/column using the interference logic operation shown in Table 1, performing the interference logic operation shown in Table 1 on the binary elements $p_1$ and $p_2$ at the same position in the images:

TABLE 1

| Input | | Output |
|---|---|---|
| $p_1(x, y)$ | $p_2(x, y)$ | $p_1(x, y) \odot p_2(x, y)$ |
| 0 | 1 | 0 |
| 0 | 0 | 0 |
| 1 | 1 | 1 |
| 1 | 0 | 0 |

In the above table, $p_1$ is the encoding value located in the x-th row and y-th column of the high-frequency pattern, $p_2$ is the encoding value located in the x-th row and y-th column in the binary grating/reverse binary grating, and $\odot$ is the interference logic operator, $p_1(x, y) \odot p_2(x, y)$ represents the output result of the interference logic operation, and the output result is taken as the encoding value of the x-th row and y-th column in the interfering binary grating.

Step 4), the projection images of multiple interfering binary gratings projected by the projector and then collected by the camera are used as output images, and all output images are synthesized in a certain manner to obtain an output image after reflection suppression, the reflection suppression of the output image corresponding to the binary grating projection is realized;

The reflection suppression is to suppress the reflection area that appears in the output image when the binary grating used for three-dimensional appearance measurement is projected. The reflective area is a high-brightness area formed by the accumulation of reflected light generated by the grating light source irradiating the surface of the object to be measured in a specific position. The above-mentioned high-frequency patterns, inverted binary gratings, and interfering binary gratings are all used to achieve reflection suppression.

Figure 3:
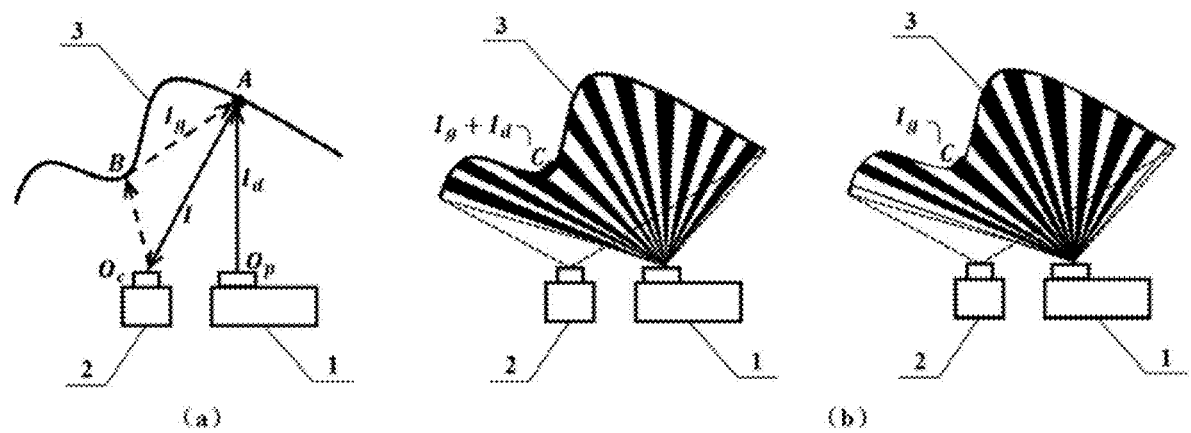
FIG. 3 (a) is the model diagram established by the present invention for the reflection phenomenon.

In the step 4), the synthesis process of the output image is traversing for each row/column in the following manner, including: Step 4.1), the N output images corresponding to the forward interfering binary grating are represented for $I_1^+$, $I_2^+$, ..., $I_N^+$, and the N output images corresponding to the inverse interfering binary grating are represented for $I_1^-$, $I_2^-$, ..., $I_N^-$, for each pixel (x, y) in the output image, perform the following processing to obtain a forward auxiliary image $A^+$ and a reverse auxiliary image $A^-$ for following reflection suppression:

$$\begin{cases} A^+(x, y) = \max[I_1^+(x, y), I_2^+(x, y), \ldots, I_N^+(x, y)] - \\ \qquad \min[I_1^+(x, y), I_2^+(x, y), \ldots, I_N^+(x, y)] \\ A^-(x, y) = \max[I_1^-(x, y), I_2^-(x, y), \ldots, I_N^-(x, y)] - \\ \qquad \min[I_1^-(x, y), I_2^-(x, y), \ldots, I_N^-(x, y)] \end{cases}$$

wherein, (x, y) is the pixel in the x-th row and y-th column in the output image; max[ . . . ] represents the maximum value of all gray values in the square brackets;

Combining FIG. 3 and the light intensity decomposition formula, taking the forward auxiliary image $A^+$ as an example, the calculation principle of the above formula is explained as follows:

For each pixel with an encoding value of 1 in the binary grating, the encoding value at this pixel in the multiple positive interfering binary gratings is not all 0 nor all 1. An encoding value of 0 indicates that the light source at the coded pixel is off, and an encoding value of 1 indicates that the light source at the coded pixel is on. The light source generated at the above pixel points guarantees: for any scene point (x, y) that may be illuminated by the light source on the surface of the object under test, multiple light sources generated by multiple forward interfering binary gratings may directly illuminate the scene point (as shown in the left image of FIG. 3(b)), the scene point may not be directly illuminated (as shown in the right image of FIG. 3(b)), and the above two situations must exist. As shown in the left image of FIG. 3(b), for the case of direct illumination, the light intensity at the scene point in the output image is represented for $I_+(x,y)=I_d(x,y)+I_g(x,y)$; as shown in the right image of FIG. 3(b) for the case of not direct illumination, the light intensity at the scene point in the output image is represented for $I_-(x,y)=I_g(x,y)$; and it must be $I_+(x,y)>I_+(x,y)$. Therefore, in the N output images corresponding to the forward interfering binary grating, $I_+(x,y)$ and $I_-(x,y)$ can be calculated in the manner with taking the maximum value and the minimum value as follows:

$$\begin{cases} I_+(x, y) = \max[I_1^+(x, y), I_2^+(x, y), \ldots , I_N^+(x, y)] \\ I_-(x, y) = \min[I_1^+(x, y), I_2^+(x, y), \ldots , I_N^+(x, y)] \end{cases},$$

According to the above formula, the reflective component is removed and the direct component is retained by the following calculation, and the forward auxiliary image $A^+$ is calculated to achieve the reflection suppression:

$$A^+(x,y)=I_d(x,y)I_+(x,y)-I_-(x,y)$$

The calculation principle of the reverse auxiliary image $A^-$ can be deduced by analogy, so it won't be repeated here.

Step 4.2), the forward auxiliary image $A^+$ and the reverse auxiliary image $A^-$ are subjected to a differential operation to obtain the output image R after reflection suppression. The differential operation refers that for each pixel (x, y) in the output image, perform the following calculation as:

$$R(x,y)=A^+(x,y)-A^-(x,y)$$

Figure 5A:
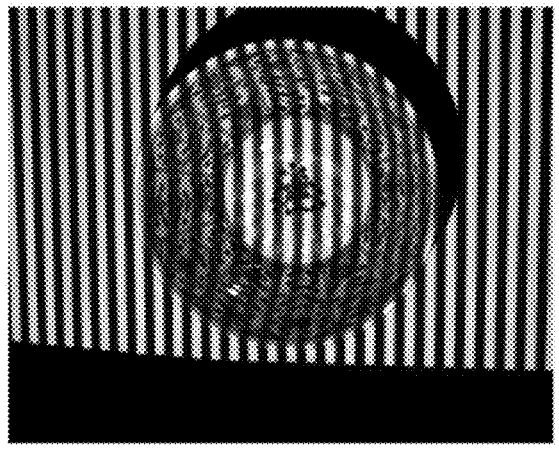
Figure 5B:
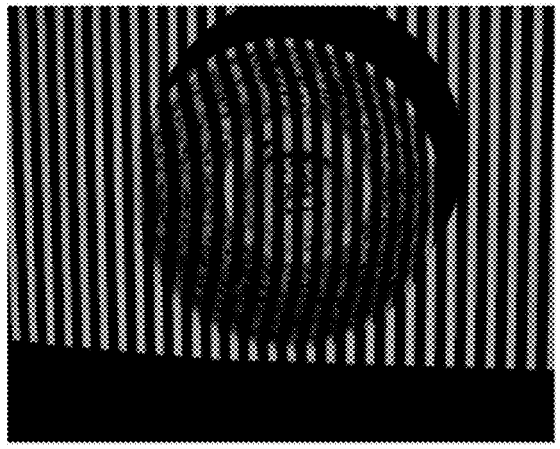
Figure 6A:
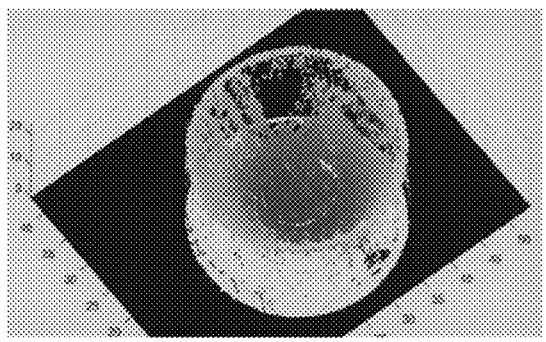
Figure 6B:
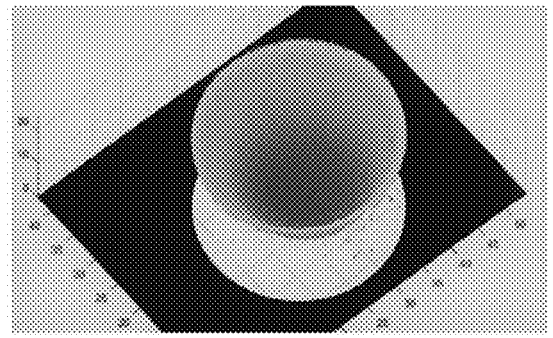

In order to show the effect of reflection suppression in the present invention on the binary grating image projection, the ceramic bowl is used as the object to be measured, and the binary grating projection obtained by projected by the projector and collected by the camera is shown in FIG. 5(a). Using the method of the present invention, the result shown in FIG. 5(a) is subjected to reflection suppression, and the resulting output image after reflection suppression is shown in FIG. 5(b). Corresponding to FIG. 5(a), the three-dimensional appearance measurement result of the ceramic bowl obtained before the reflection suppression is shown in FIG. 6(a). Corresponding to FIG. 5(b), after the method of the present invention is used to suppress light reflection, the resulting three-dimensional appearance result of the ceramic bowl is shown in FIG. 6(b).

In FIG. 5(a), when there is no reflection suppression, there are obvious reflective circles at the bottom of the ceramic bowl, and obvious reflective spots are distributed on the wall and edge of the ceramic bowl. After the reflection suppression, in FIG. 5(b), the above-mentioned reflective ring and the reflection spots are significantly removed, which shows the effectiveness of the present invention to achieve reflection suppression.

In FIG. 6(a), when the reflection suppression is not performed, the obtained three-dimensional appearance measurement results show obvious voids and missing phenomena in the reflective area. After reflection suppression, in FIG. 6(b), there are no voids or missing phenomena in the three-dimensional appearance measurement results obtained, which improves the accuracy of the three-dimensional appearance measurement based on binary grating projection and expands the adaptability of the three-dimensional appearance measurement based on binary grating projection.

The invention claimed is:

1. A method for suppressing reflection of binary grating image projection based on high-frequency pattern interference, comprising the following steps:
    step 1), generating multiple high-frequency patterns for reflection suppression;
    step 2), generating a binary grating for three-dimensional appearance measurement; wherein the binary grating is a grating composed of a binary 0-1 coded stripe code; the binary grating is inverted to generate a reverse binary grating;
    step 3), generating multiple interfering binary gratings, wherein the interfering binary grating is obtained by interfering the encoding value in the high-frequency pattern and the encoding value in the binary grating/inverted binary grating;
    step 4), using the projection images of multiple interfering binary gratings projected by a projector and then collected by a camera as output images, and synthesizing all output images in a certain manner to obtain an output image after reflection suppression, which is used as a result of the binary grating image to be projected after reflection suppression, the reflection suppression of the output image corresponding to the binary grating projection is realized.

2. The method for suppressing reflection of binary grating image projection based on high-frequency pattern interference according to claim 1, wherein: in the step 1), the high-frequency pattern is a pattern formed by array encoding in a binary 0-1 encoding mode, and the encoding value in the high-frequency pattern has high-frequency periodic changes in both the horizontal and vertical directions; the multiple high-frequency patterns satisfy the following conditions: multiple high-frequency patterns have the same number of rows and columns, and for each pixel at each position, the encoding value of the multiple high-frequency patterns at this pixel is not all 0 nor all 1.

3. The method for suppressing reflection of binary grating image projection based on high-frequency pattern interference according to claim 1, wherein the inversion operation in the step 2) is to perform a "not" logic operation on all the encoding values in the binary grating, that is, setting the element with the encoding value of 0 to 1, and setting the element with the encoding value of 1 to 0.

4. The method for suppressing reflection of binary grating image projection based on high-frequency pattern interference according to claim 1, wherein: in the step 3), the multiple high-frequency patterns are respectively interfered with the binary grating to obtain multiple forward interfering binary gratings, and the multiple high-frequency patterns are respectively interfered with the reversed binary grating to obtain multiple reverse interfering binary gratings; multiple forward interfering binary gratings and multiple reverse interfering binary gratings are gathered together to form multiple interfering binary gratings; the interference operation is performed traversing for each row/column using the interference logic operation shown in Table 1, performing the interference logic operation shown in Table 1 on the binary elements $p_1$ and $p_2$ at the same position in the images:

TABLE 1

| Input | | Output |
|---|---|---|
| $p_1(x, y)$ | $p_2(x, y)$ | $p_1(x, y) \odot p_2(x, y)$ |
| 0 | 1 | 0 |
| 0 | 0 | 0 |
| 1 | 1 | 1 |
| 1 | 0 | 0 | in the above table, $p_1$ is the encoding value located in the x-th row and y-th column of the high-frequency pattern, $p_2$ is the encoding value located in the x-th row and y-th column in the binary grating/reverse binary grating, and $\odot$ is the interference logic operator, $p_1(x, y) \odot p_2(x, y)$ represents the output result of the interference logic operation, and the output result is taken as the encoding value of the x-th row and y-th column in the interfering binary grating.

5. The method for suppressing reflection of binary grating image projection based on high-frequency pattern interference according to claim 1, wherein: in the step 4), a grating projection system is adopted; the grating projection system comprises a projector (1), a camera (2), and an object to be measured (3); the projector (1) and the camera (2) are respectively placed on both sides of an upper side of the object to be measured (3), the lens of the projector (1) and the lens of the camera (2) are facing the object to be measured (3); the interfering binary grating is input to the projector (1) and projected onto the object to be measured (3), the camera (2) collects the image projected by the interfering binary grating onto the object to be measured (3) as the output image.

6. The method for suppressing reflection of binary grating image projection based on high-frequency pattern interference according to claim 1, wherein: in the step 4), specifically:

step 4.1), the N output images corresponding to the forward interfering binary grating are represented for $I_1^+, I_2^+, \ldots, I_N^+$, and the N output images corresponding to the inverse interfering binary grating are represented for $I_1^-, I_2^-, \ldots, I_N^-$, for each pixel (x, y) in the output image, performing the following processing to obtain a forward auxiliary image $A^+$ and a reverse auxiliary image $A^-$ for following reflection suppression:

$$\begin{cases} A^+(x, y) = \max[I_1^+(x, y), I_2^+(x, y), \ldots, I_N^+(x, y)] - \\ \qquad \min[I_1^+(x, y), I_2^+(x, y), \ldots, I_N^+(x, y)] \\ A^-(x, y) = \max[I_1^-(x, y), I_2^-(x, y), \ldots, I_N^-(x, y)] - \\ \qquad \min[I_1^-(x, y), I_2^-(x, y), \ldots, I_N^-(x, y)] \end{cases}$$

wherein, (x, y) is the pixel in the x-th row and y-th column in the output image; max[ ... ] represents the maximum value of all gray values in the square brackets;

step 4.2), the forward auxiliary image $A^+$ and the reverse auxiliary image $A^-$ being subjected to a differential operation to obtain the output image R after reflection suppression; wherein the differential operation refers to that each pixel (x, y) in the output image, is expressed as:

$$R(x,y) = A^+(x,y) - A^-(x,y).$$

\* \* \* \* \*